US009689263B2

(12) United States Patent
Gharaibah et al.

(10) Patent No.: US 9,689,263 B2
(45) Date of Patent: Jun. 27, 2017

(54) DROPLET CATCHER FOR CENTRIFUGAL COMPRESSOR

(75) Inventors: Emad Ahmad Obaid Gharaibah, Sandvika (NO); Ciro Cerretelli, Vignate (IT); Michael Bernhard Schmitz, Villingen-Schwenningen (DE)

(73) Assignee: General Electric Company, Schenectady, NY (US)

( * ) Notice: Subject to any disclaimer, the term of this patent is extended or adjusted under 35 U.S.C. 154(b) by 1040 days.

(21) Appl. No.: 13/504,658

(22) PCT Filed: Oct. 27, 2009

(86) PCT No.: PCT/US2009/062205
§ 371 (c)(1),
(2), (4) Date: Mar. 21, 2013

(87) PCT Pub. No.: WO2011/053278
PCT Pub. Date: May 5, 2011

(65) Prior Publication Data
US 2013/0195608 A1    Aug. 1, 2013

(51) Int. Cl.
*B63H 1/28* (2006.01)
*F03D 11/00* (2006.01)
(Continued)

(52) U.S. Cl.
CPC ............. *F01D 5/14* (2013.01); *B01D 45/14* (2013.01); *F04D 27/0292* (2013.01);
(Continued)

(58) Field of Classification Search
CPC . B01D 45/14; F01D 51/14; F01D 5/12; F01D 25/32; F04D 29/284; F04D 29/701;
(Continued)

(56) References Cited

U.S. PATENT DOCUMENTS 3,104,964 A  *  9/1963  Craft ..................... F04D 1/12
                                                 415/143
3,318,077 A  *  5/1967  Skopek ................. F01D 25/32
                                                 55/447
(Continued)

FOREIGN PATENT DOCUMENTS

CH         248468 A      3/1948
CN      101479467 A      7/2009
(Continued)

OTHER PUBLICATIONS

Unofficial English translation of RU Office Action dated Sep. 12, 2013 from corresponding RU Application No. 2012118515.
(Continued)

*Primary Examiner* — Deming Wan
(74) *Attorney, Agent, or Firm* — GE Global Patent Operation (57) ABSTRACT

A liquid droplet catching device installed in a compressor impeller, the device includes an aperture disposed on a surface of the impeller and configured to receive the liquid droplet, and a channel disposed beneath and in fluid communication with the aperture, wherein in the channel is configured to direct the liquid droplet away from the aperture and out of the compressor impeller.

21 Claims, 8 Drawing Sheets

(51) Int. Cl.
  *F04D 29/22*   (2006.01)
  *F04D 29/32*   (2006.01)
  *F04D 29/38*   (2006.01)
  *F01B 31/28*   (2006.01)
  *F01D 25/32*   (2006.01)
  *F01D 5/14*    (2006.01)
  *B01D 45/14*   (2006.01)
  *F04D 29/28*   (2006.01)
  *F04D 29/70*   (2006.01)
  *F04D 27/02*   (2006.01)

(52) U.S. Cl.
  CPC ......... *F04D 29/284* (2013.01); *F04D 29/701* (2013.01); *F04D 29/706* (2013.01)

(58) Field of Classification Search
  CPC ............ F05B 2260/602; F05B 2260/64; F05D 2260/602; F05D 2260/608
  USPC ............... 415/1, 115, 169.2–169.4; 416/181, 416/231 R, 231, 231 B
  See application file for complete search history.

(56) References Cited

U.S. PATENT DOCUMENTS

| | | | |
|---|---|---|---|
| 3,785,128 A | | 1/1974 | Redemann |
| 4,622,687 A | * | 11/1986 | Whitaker ............. H01J 35/106 313/30 |
| 5,328,326 A | | 7/1994 | Gros et al. |
| 6,351,938 B1 | * | 3/2002 | Kerrebrock ............. F01D 5/046 60/806 |
| 6,361,270 B1 | * | 3/2002 | Bennett ..................... F04D 1/10 415/143 |
| 7,517,186 B2 | | 4/2009 | Seitz et al. |
| 2006/0165528 A1 | | 7/2006 | Junker |
| 2007/0274824 A1 | * | 11/2007 | Burdgick ................ F01D 5/145 415/169.1 |
| 2009/0087298 A1 | | 4/2009 | Shibata |

FOREIGN PATENT DOCUMENTS

| | | |
|---|---|---|
| GB | 1531700 A | 11/1978 |
| GB | 2269893 A | 2/1994 |
| RU | 2058494 C1 | 4/1996 |

OTHER PUBLICATIONS

Search Report and Written Opinion from corresponding PCT Application No. PCT/US2009/062205, dated Dec. 29, 2009.

Search Report from corresponding EP Application No. 08155239, dated Oct. 9, 2008.

Unofficial English translation of CN Office Action dated Nov. 20, 2013 from corresponding Application No. 200980163201.0.

* cited by examiner

FIG. 8

DROPLET CATCHER FOR CENTRIFUGAL COMPRESSOR

CROSS REFERENCE TO RELATED APPLICATIONS

This is a national stage application under 35 U.S.C. §371(c) of prior-filed, co-pending PCT patent application serial number PCT/US2009/062205, filed on Oct. 27, 2009, the entire contents of which are incorporated herein by reference.

BACKGROUND OF THE INVENTION

Field of the Invention

The present disclosure relates generally to centrifugal compressors, and more particularly, to droplet catchers for removal of liquid from the compressor environment. This disclosure also relates to centrifugal compressors comprising such devices, and methods of improving the performance of the compressors with the devices.

Description of the Prior Art

A compressor is typically used to boost pressure of a working fluid by receiving power from an electric machine or a turbine, and applying a compressive force to the working fluid. The working fluid may be air, gas, refrigerant, or the like. Compressors are typically classified as positive displacement compressors, dynamic compressors, or turbo compressors, depending on the method they employ for compression.

Positive displacement compressors are typically used to boost pressure of the working fluid by reduction in volume. One type of positive displacement compressor is a centrifugal compressor. Centrifugal compressors operate by accelerating the working fluid (e.g., gas) through the use of rotating blades, and then restricting the exiting gas so that it is compressed.

Figure 1:
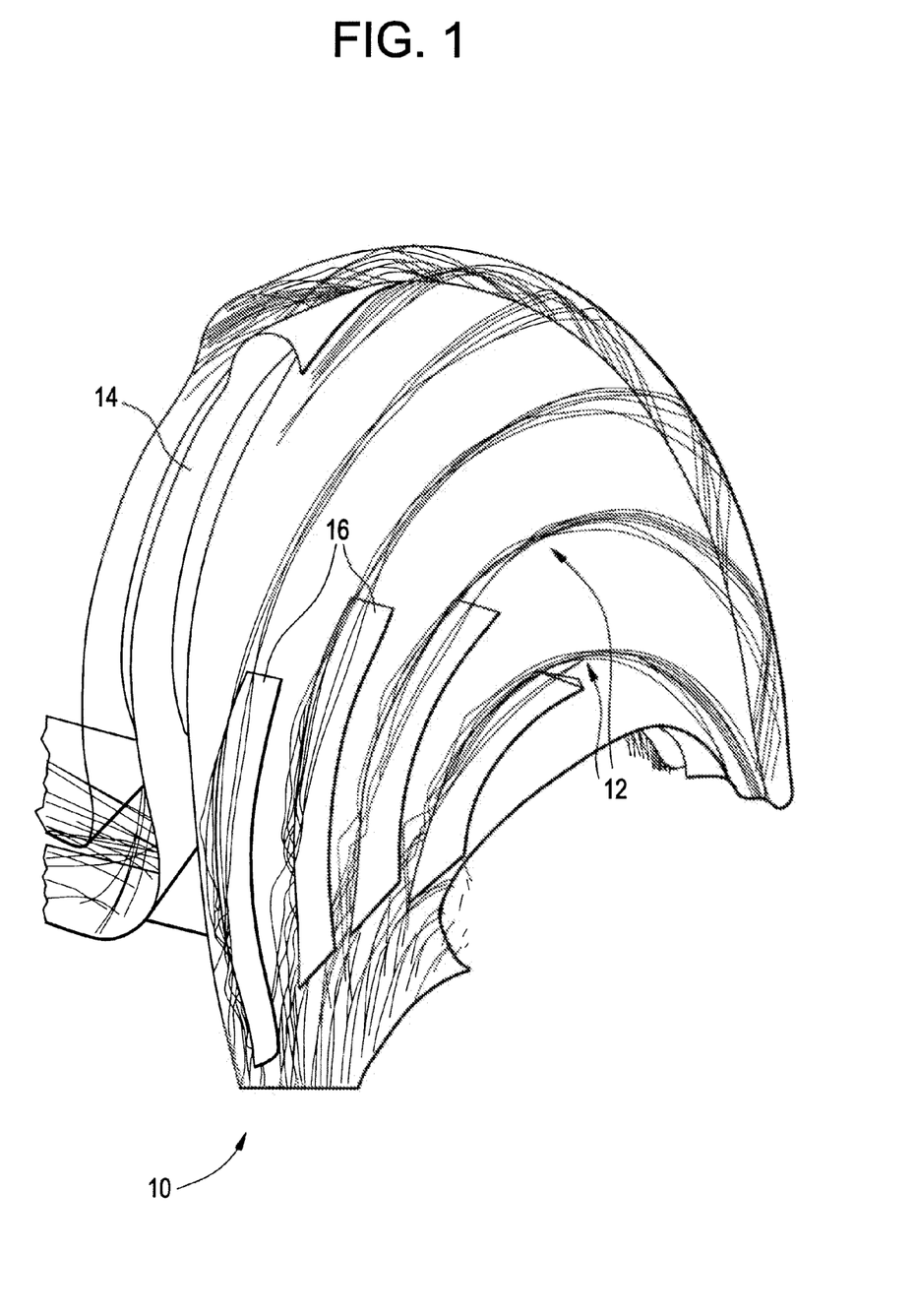
FIG. 1 is a prior art centrifugal impeller showing liquid droplet flow patterns.

Contaminants, such as liquid or solid particles, in the inlet gas can have a severe effect on compressor reliability. Mechanical failures of centrifugal compressors can be caused in many instances by liquid aerosol contamination (i.e., liquid droplets) of the intake gas. Liquid droplets may accumulate in a stream of gas by condensation as the gas impacts surfaces within the compressor. FIG. 1 illustrates a portion of a prior art centrifugal compressor and the gas-liquid droplet flow pattern seen in such current centrifugal compressors. As FIG. 1 shows, droplets first impact the compressor at the surface of the impeller 14, particularly the blades 16 of the impeller.

The droplets 12 hit the rotating impeller 14, collide with each other, and form larger droplets. While a portion of the larger droplet is likely to continue on in the gas flow direction of the compressor, the remaining portion of the larger droplet sticks to the rotating impeller surface. This larger droplet is now more likely to coalesce with new droplets impacting the surface. The droplets thus become larger, their evaporation is hindered, and their erosive potential is higher. The liquid phase volume in the compressor can increase and the efficiency of the compressor is reduced proportionally. The liquid film that forms on the blade surface or casing due to droplet deposition can become unstable and can also lead to formation of droplets of large size that are potentially very harmful as far from an erosion standpoint. Over time, the increased liquid phase volume and contaminants associated therewith will corrode and damage the compressor, leading to failure, or at least frequent shut downs for inspection and repair.

Whenever a non-negligible amount of water is contained in the stream at the inlet, droplet separation devices are installed upstream of the first stage in current centrifugal compressors to separate all the water content from the mixture. Current droplet separation devices, however, provide no separation technique that captures the liquid droplets before they are able to coalesce and become larger. This results in a strong intercooling effect, delayed evaporation and a high local volume faction/concentration of the liquid phase, thereby strongly affecting the performance of the compressor.

BRIEF SUMMARY OF THE INVENTION

Disclosed herein are droplet catchers for removing liquid droplets from centrifugal compressors. In one embodiment the article includes a liquid droplet catching device installed in a compressor impeller. The device includes an aperture disposed on a surface of the impeller and configured to receive the liquid droplet, and a channel disposed beneath and in fluid communication with the aperture, wherein in the channel is configured to direct the liquid droplet away from the aperture and out of the compressor impeller.

In another embodiment a centrifugal compressor includes a centrifugal impeller. The centrifugal impeller comprises a plurality of rotating integral blades, each of the plurality of rotating integral blades having a root portion and a tip portion, wherein the plurality of rotating integral blades are configured to compress air in a centrifugal gravitational field, and a plurality of liquid droplet catching devices disposed on the plurality of rotating integral blades, wherein the liquid droplet catching device comprises an aperture disposed on a surface of the impeller and configured to receive the liquid droplet, and a channel disposed beneath the aperture within the plurality of rotating integral blades and in fluid communication with the aperture, wherein the channel is configured to direct the liquid droplet away from the aperture and out of the centrifugal compressor.

A method of improving the performance of a centrifugal compressor through liquid droplet removal includes positioning a liquid droplet catching device in a portion of a centrifugal impeller effective to capture the liquid droplet at a point of impact with the centrifugal impeller, wherein the liquid droplet catching device comprises an aperture disposed on a surface of the centrifugal impeller, and a channel disposed beneath the aperture within the centrifugal impeller and in fluid communication with the aperture; capturing the liquid droplet in the aperture of the liquid droplet catching device; and removing the liquid droplet from the centrifugal compressor by directing the liquid droplet from the aperture to the channel of the liquid droplet catching device.

The above described and other features are exemplified by the following figures and detailed description.

BRIEF DESCRIPTION OF THE DRAWINGS

Referring now to the figures wherein the like elements are numbered alike.

DETAILED DESCRIPTION OF THE INVENTION

The present disclosure relates to a liquid droplet catching device (hereinafter a "droplet catcher") for removing liquid droplets from a centrifugal compressor. The droplet catcher as described herein enables the efficient collection of liquid droplets and directs them into channels that direct them out of the compressor. Existing concepts of droplet separators are generally based on catchers or filters that are mounted on the outer circumference of the compressor shroud. One of the disadvantages with these separators is that the droplets have time to coalesce and grow before moving from the impeller to the outer circumference of the compressor. The delay permits the global volume fraction of liquid to grow within the compressor. Another disadvantage of such separators is the detachment of large droplets from the breakup of the growing liquid film on the compressor surface. The droplet catchers as disclosed herein remove the liquid droplets at the expecting points of impact with the impeller surface, before coalescence takes place. The sticking droplets are immediately removed from the surface by the droplet catchers so that there is no chance the liquid will be accelerated about the compressor again to form new droplets. As a result, the global volume fraction of liquid phase in the compressor can be maintained at an acceptable minimum range, thereby keeping operating conditions near those designed for the compressor.

As mentioned, the droplet catchers as disclosed herein can be employed in any centrifugal compressor adapted to compress a gaseous fluid. An example of such a compressor can be found in, for example, a gas turbine engine system or an industrial compressor system. Referring to the drawings in general and to FIG. 5 in particular, it will be understood that the illustrations are for the purpose of describing a particular embodiment of the droplet catcher disclosed herein and are not intended to be limited thereto.

Figure 2:
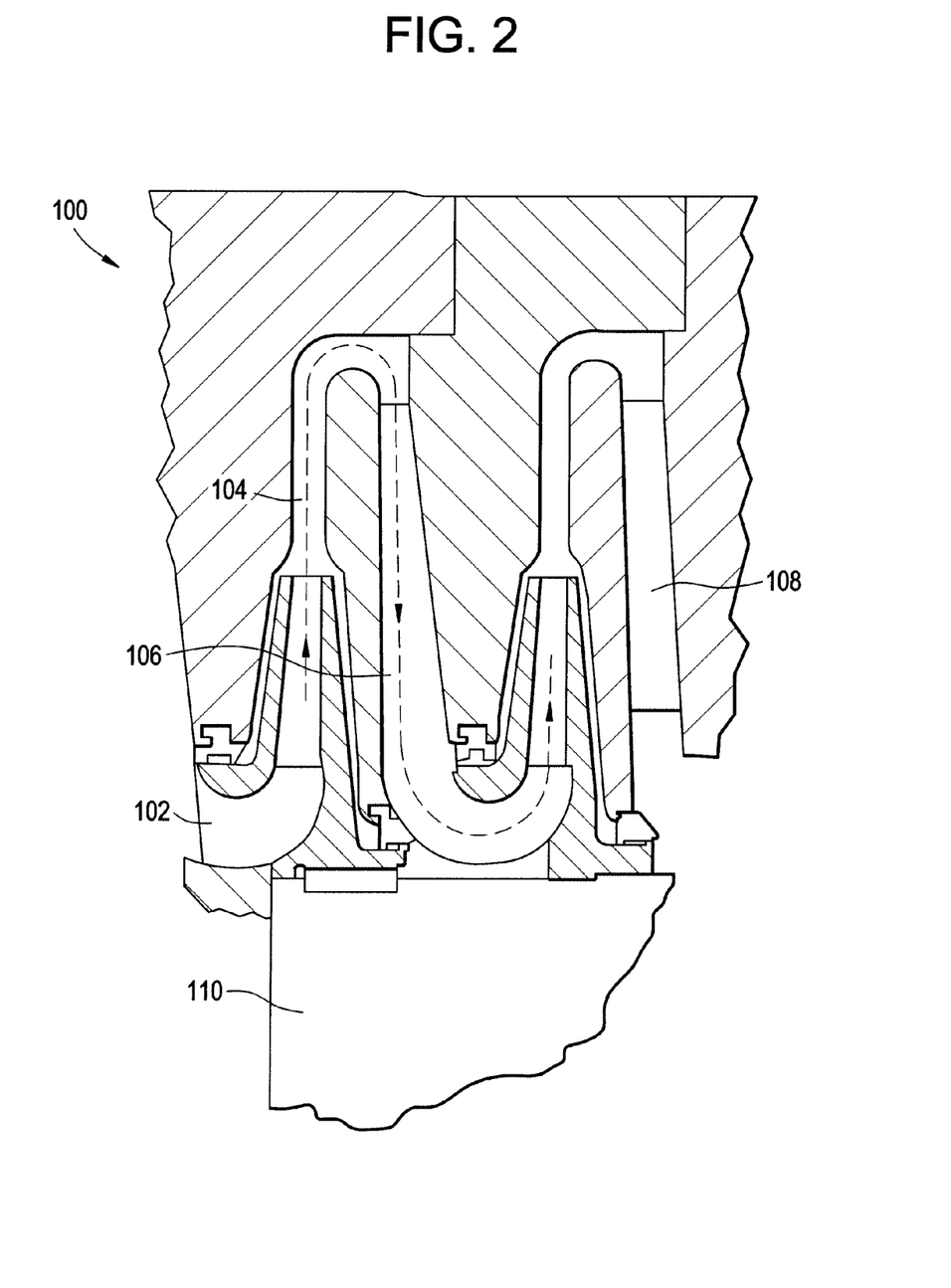
FIG. 2 is a cross-sectional schematic of the centrifugal stage of a conventional industrial compressor.

FIG. 2 is a schematic cross-sectional view of a centrifugal stage from a typical industrial compressor. Specifically, the figure illustrates the gas flow path through the centrifugal section 100 within an industrial compressor. Air from the inlet 102 travels through a diffuser 104. The air is driven forward through the diffuser and snakes through a return channel 106 heading toward the centrifugal impeller 108. The impeller blade drives the air outward and further compresses the air prior to its entry into the combustion area (not shown). At the centrifugal impeller 108, the air volume is contained by the impeller itself and the centrifugal stage sleeves 110. As will be discussed in greater detail below, the centrifugal impeller 108 of an industrial compressor can incorporate the droplet catchers as disclosed herein to provide efficient collection of liquid droplets and prevent them from coalescing on the impeller blades and potentially damage the compressor efficiency.

Figure 3:
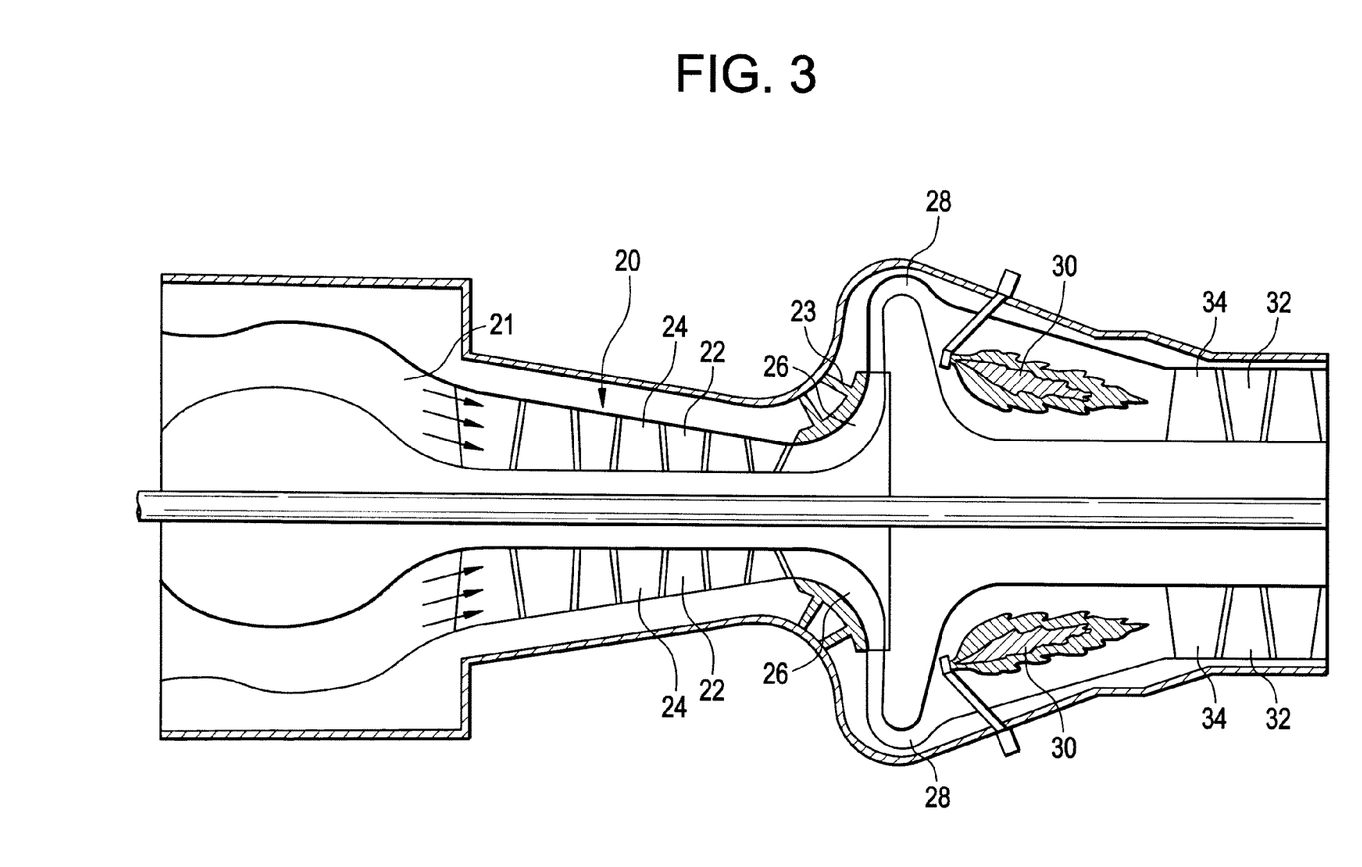
FIG. 3 is a cross-sectional schematic of a conventional gas turbine engine.

FIG. 3 shows another application where the droplet catchers described herein can be employed. In FIG. 3 a schematic cross-sectional view of an exemplary gas turbine engine is illustrated. From this point forward, reference herein will be made to the use of the centrifugal compressors employed in gas turbine engine systems. It is to be understood, however, that the compressors, and thereby the droplet catchers, disclosed herein can be used in any system or process wherein the presence of liquid droplets in a compressor system is detrimental to efficiency and/or operating life, such as, for example, industrial compressors as described above.

FIG. 3 shows the gas flow path through the central part of a gas turbine engine 18 with a conventional axial-centrifugal compressor 20. Air from the inlet 21 travels through a series of axial stages of rotating blades 24 and static stators 22. These rotating axial stages drive the air forward and thereby compress the air in an efficient manner. After the air passes through the axial section of the compressor 20, the centrifugal impeller 26 drives the air outward and further compresses the air prior to its entry into the diffuser 28 and the combustion area 30. At the centrifugal impeller 26, the air volume is contained by the impeller itself and the impeller shroud 23. The compressed air is heated in the combustion area and travels through the turbine nozzle 32 and the rotating turbine rotor 34 where work is recovered from the high temperature highly compressed gas.

Figure 4:
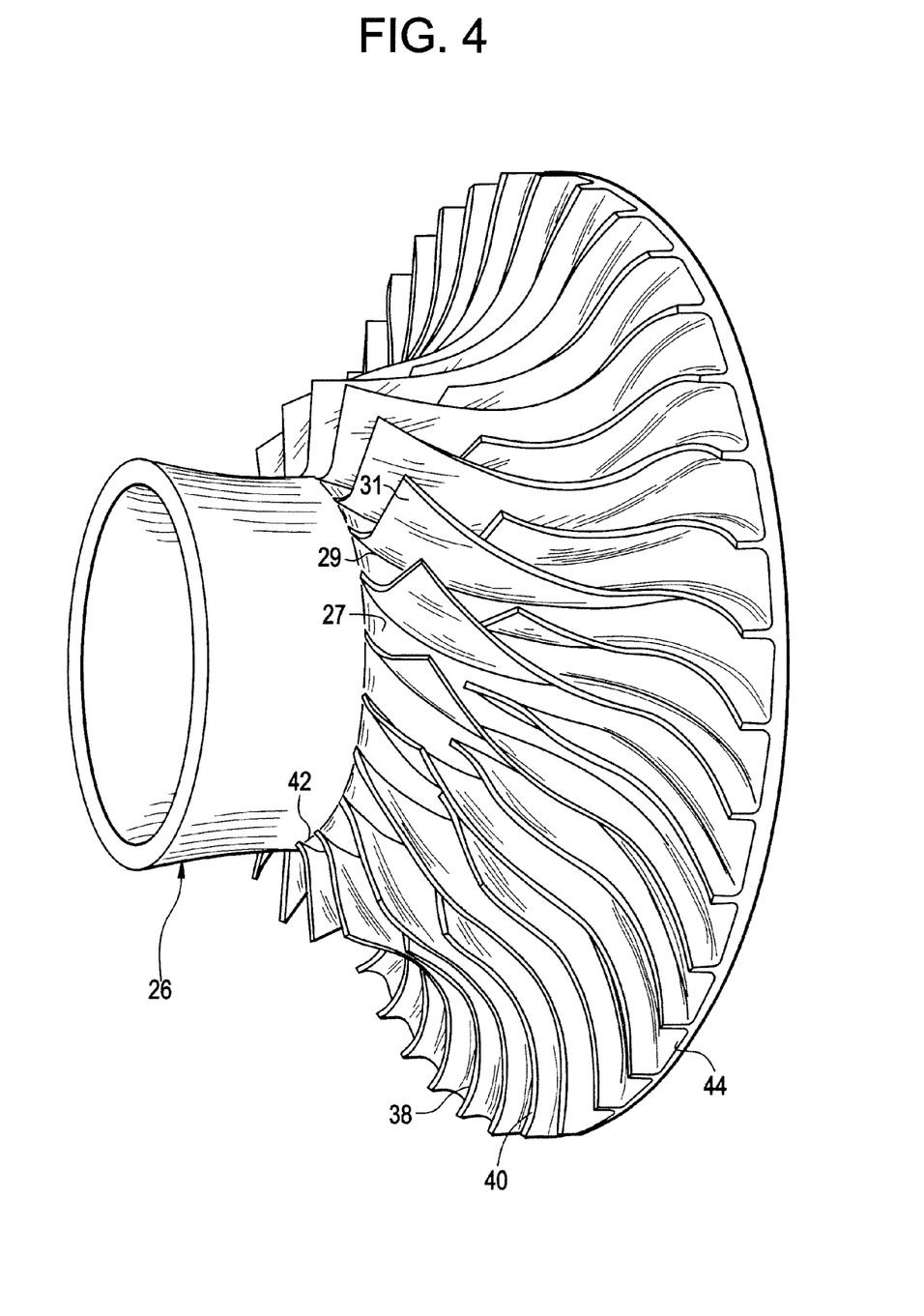
FIG. 4 is a cross-sectional schematic of a centrifugal impeller used with the gas turbine engine of FIG. 3.

FIG. 4 is a perspective drawing of a conventional centrifugal impeller 26 as shown in the cross-section drawing FIG. 3. Rotating integral blades 38 can be described as twisted sheets designed to compress air in a centrifugal gravitational field. Splitter blades 40, which are partial versions of the larger continuous blades 38, prevent excessive diffusion of gas flow as the air channels increase in size with the increasing impeller circumference from the air inlet 42 to the exit 44. It should be noted that modern impellers are generally machined in one piece.

Air enters the centrifugal impeller 26 in the axial inlet area 42. The air entering at the inlet has been compressed by the axial compressor stages upstream of the centrifugal impeller. The air, at the inlet, is therefore moving in a direction parallel to the axis of rotation and is already highly compressed. The inner flow path of the air in the impeller is formed by the impeller hub 27. The air itself is driven forward and compressed by the impeller blades 38 in all areas of the blade from blade root 29 to blade tip 31. As the air proceeds through the centrifugal impeller, the flow direction changes from parallel to the axis of rotation to perpendicular to it in all directions. The air, by the time it reaches the exit 44, is moving primarily outwardly from the axis of rotation and no longer moving along that axis. The flow field at that point may be described as a centrifugal flow field, in that the primary direction of the air at the centrifugal impeller exit 44 is tangential.

Figure 5:
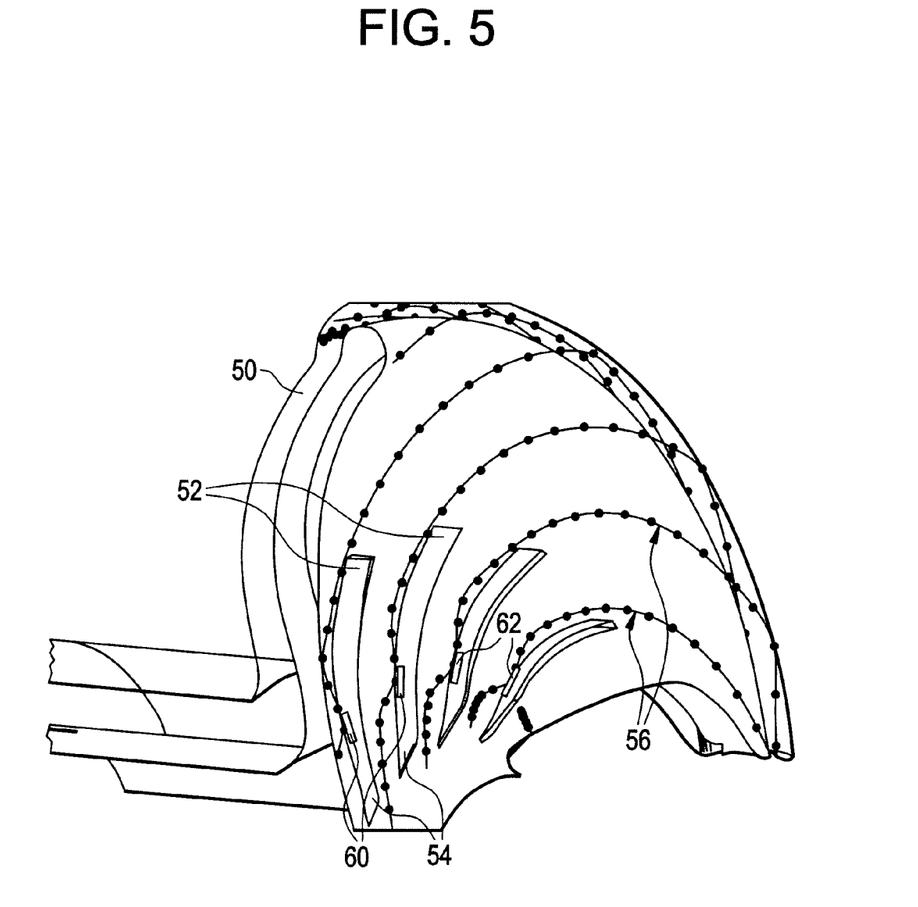
FIG. 5 is a cross-sectional schematic of an exemplary embodiment of a centrifugal impeller incorporating the liquid droplet catching device according to an embodiment of the present invention.

Referring now to FIG. 5, a cross-section of a centrifugal impeller 50 incorporating the droplet catchers 60 of this disclosure is illustrated. The impeller 50 can be installed in the centrifugal compressor of FIG. 2 in place of the conventional impeller 26, or in the place of existing impellers comprising conventional droplet separators. Moreover, in another embodiment, the droplet catchers 60 can be disposed on an impeller in combination with a compressor comprising existing shroud catchers or filters. The droplet catchers 60 can be placed anywhere along the surface of the impeller 50. In an exemplary embodiment, a droplet catcher 60 is disposed on each blade 52 of the impeller 50 at the expected point of impact for the liquid droplets. The expected point of impact for the liquid can depend on many variables such as, for example, the speed of the compressor, the size of the impeller, the size of each blade, the angle of the impeller blades, the liquid condensing in the compressor (e.g. water), and the like.

In this particular embodiment, each droplet catcher 60 is shown disposed on the root portion 54 of each blade 50. The catcher 60 can further extend on to the blade itself, as well as incorporate a part of the adjacent hub surface near the root portion. The blade catcher 60 comprises an aperture 62 having a slot shape on the expecting points of impact on the impeller 50. The slot aperture 62 is effective to provide an entrance for the liquid droplets to flow. This enables the efficient collection of the droplets and directs them into channels (not shown) of the droplet catcher 60 that direct the liquid droplets out of the compressor.

Figure 6:
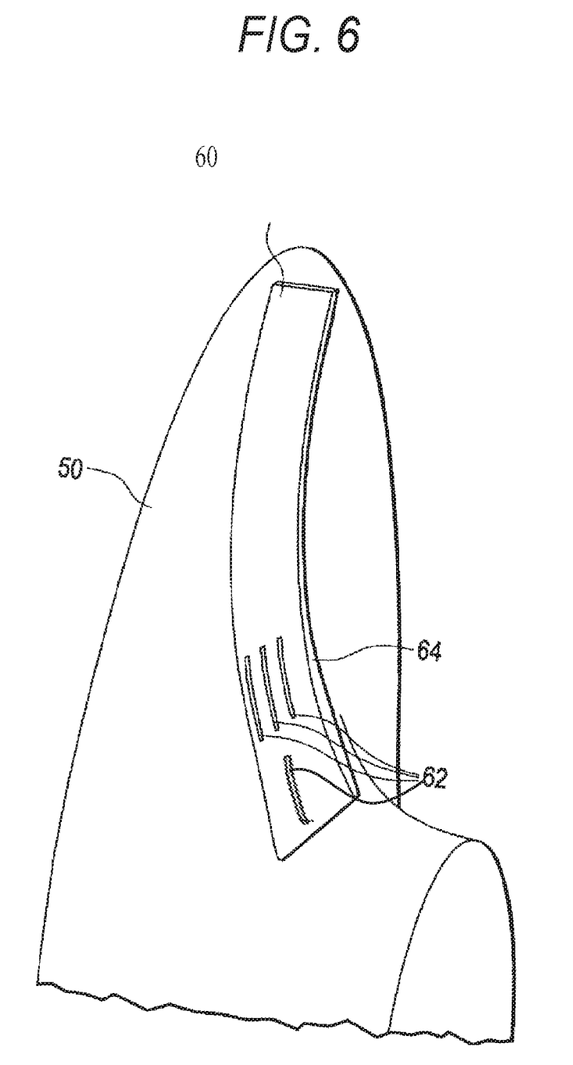
FIG. 6 illustrates one of the exemplary droplet catching devices of FIG. 5 in magnified detail according to an embodiment of the present invention.

FIG. 6 illustrates one of the droplet catchers 60 in greater detail. The exemplary embodiment of the droplet catcher 60 comprises 3 separate slot apertures 62. In another embodiment, there can be more or less than 3 slot apertures. For example, in some embodiments there can be a plurality of slot apertures on a given droplet catcher. In a different embodiment, only one slot aperture per droplet catcher is needed. The slot apertures 62 are in fluid communication with a channel 64 disposed beneath the apertures within the body of the droplet catcher 60 and/or the impeller blade 50 itself. The slot apertures can have any size, shape, number, and dimension suitable for capturing the liquid droplets at first impact, before the droplets have a chance to coalesce on the impeller surface, for a particular system. The slot parameters (e.g., size, shape, number, dimensions) will depend on the flow parameters and operating conditions of the compressor on which the droplet catcher is disposed. The slot parameters should be designed such that efficient collection of the droplets is achieved, and the droplets are directed into the channel, which directs the accumulated liquid out of the compressor system. Important factors to consider in determining the parameters of the slot aperture include, without limitation, impeller size, blade design, droplet catcher location, compressor size, compressor speed, liquid droplet composition, and the like. Moreover, the channel depths will be sufficient to carry the droplets as they enter the catcher 60 away from the slot aperture 62 and out of the compressor without causing a back up of liquid back onto the impeller surface. The channels are configured such that the centrifugal force of the spinning impeller is effective to draw the droplets from the slot entrance 62 along the channel 64 and out of the compressor shroud.

Figure 7:
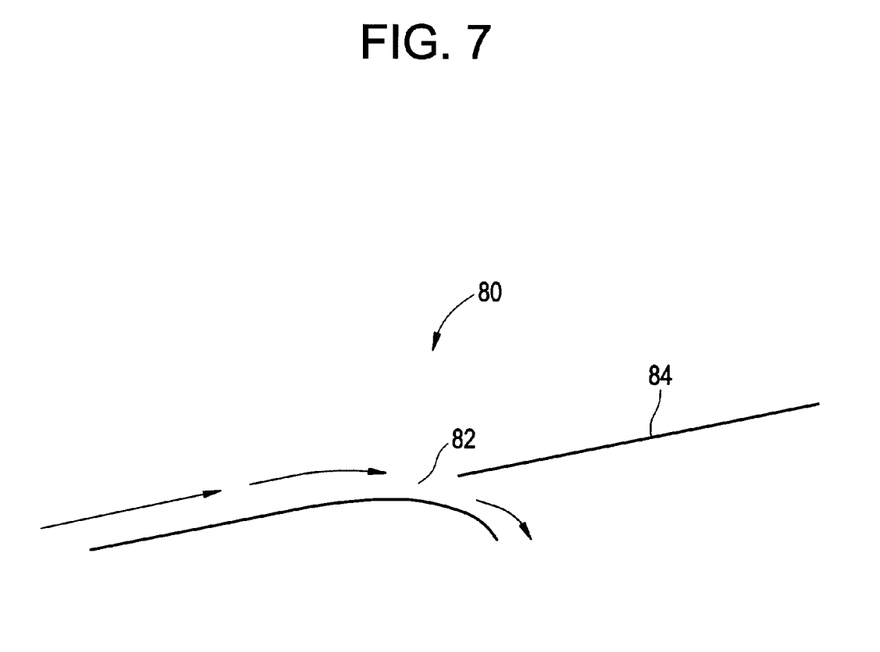
FIG. 7 is a cross-sectional schematic of an exemplary embodiment of a slot-type droplet catcher according to an embodiment of the present invention.

FIG. 7 illustrates an optional embodiment of a droplet catcher 80. The droplet catcher 80 is a slot-type catcher, which is effective for removing the drops directly from the blade surface. As shown in FIG. 7, the droplet catcher 80 can be a slot-like aperture 82 in the surface of a turbine blade 84. The arrows indicate the direction of the flow of fluid (e.g., water) across the blade 84. The entrance side (i.e., upstream end) of the catcher 80 bends down and simultaneously travels beneath and away from the surface of the blade 84 in a downstream direction, such that a liquid droplet traveling in the direction of the arrows will follow the bend of the catcher and be removed from the blade surface. The droplet catcher 80 is particularly suited for draining recently formed film from a turbine surface. As such, the droplet catcher 80 can be positioned downstream of the droplet impact area. Because of the difference in optimum effectiveness, the slot-type droplet catcher 80 can be used in combination with the droplet catcher 60 described above. The droplet catcher 60 can be positioned directly at the point of impact with the droplet since for that purpose a simpler opening of the droplet catcher 60 can be more effective for removing the droplet, while the slot-type droplet catcher 80 can be positioned downstream of the droplet catcher 60 in an area effective to drain recently formed liquid film from droplets not caught by or landing downstream of, the droplet catcher 60. Black dots are included in FIG. 5 to illustrate the flow pattern of the liquid droplets 56 in the compressor. As described above, the droplet catcher 60 is positioned to capture those liquid droplets at the expected point of impact with the impeller.

To reiterate, in an optional embodiment additional droplet catchers can be positioned further downstream of the expected point of impact. For example, slot-type droplet catchers, such as those illustrated in FIG. 7, can be employed downstream of and in combination with the droplet catcher 60. The flow pattern illustrates some of the liquid droplets being captured in the slot aperture 62 upon impact with the impeller. The droplet catcher 60, however, will not capture and collect every liquid droplet. The flow pattern shows some droplets 56 impacting a region of the impeller outside of the droplet catcher 60. Centrifugal forces will carry these droplets to the outer perimeter of the impeller 50. Because the droplet catchers 60 have captured many of the impending droplets 56, the chance for stagnant drops to build up on the wall and form a film are reduced. These remaining droplets, therefore, can travel off the impeller and be captured by optional existing droplet separator devices, such as catchers and filters mounted on the compressor shroud. Alternatively, in the case of a multi-stage centrifugal compressor, the remaining droplets 56 can be captured by a second set of droplet catchers located on the impeller of the subsequent stage. In this manner, the global volume fraction of liquid phase in the multi-stage compressor will decrease as the liquid droplets travel from stage to stage, such that a minimum amount of liquid is present at the compressor exit. The droplet catchers of each compressor stage can have the same dimensions and mounting locations, or the catchers can be located on different parts of the blade and have dimensions that vary from stage to stage. For example, it could be that as the amount of liquid droplets is reduced from stage to stage, the droplet catchers of the latter stages can be of a reduced size and dimension than those in the early stages when the liquid droplets are heaviest and the most contaminants are present in the compressor.

Figure 8:
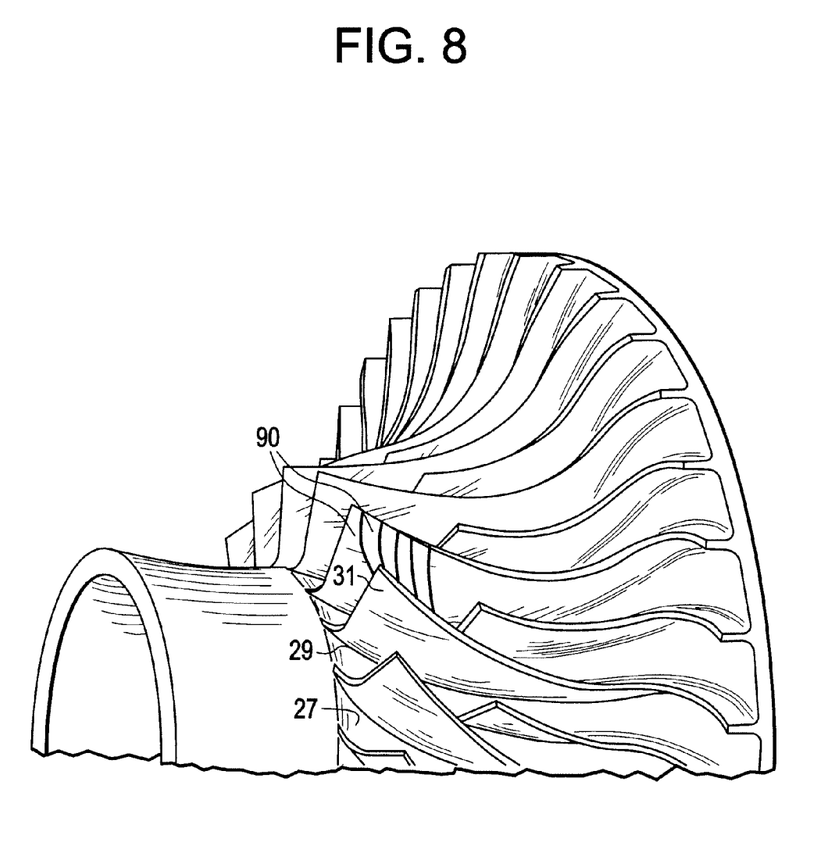
FIG. 8 is an enlarged view of the impeller of FIG. 3 illustrating optional striping or grooving according to an embodiment of the present invention.

Referring back now to FIG. 4, the centrifugal impeller 26 can further optionally comprise striping or carved grooves 90 disposed on the blades 38, in order to help the collection of water. FIG. 8 is a magnified view of a section of the impeller 26 illustrating the grooves 90. The striping or grooves 90 can be configured to drain the water down the impeller blade surface either toward the droplet catcher slots or toward the impeller casing where other droplet collection devices can be disposed. Moreover, the centrifugal impeller as shown in FIG. 8 can further optionally comprise a drainage line configured to collect the liquid droplet flow from each of the droplet catchers 60. The drainage line can be disposed below the droplet catcher, i.e., below the impeller blade surface and, therefore, not visible in the figure. The drainage line can have any suitable shape for collecting the liquid, such as a trough, tube, pipe, or the like. The drainage line can further be connected to a receptacle disposed outside the compressor housing for collection and periodic disposal of the liquid collected during operation of the compressor.

In operation, a method of removing liquid and contaminants from a centrifugal compressor can include positioning a droplet catcher on an impeller surface, wherein the droplet catcher is disposed in a position effective to capture a liquid droplet at the point of impact with the impeller surface. The droplet catcher can comprise a slot aperture configured to receive the liquid droplet, and a channel in fluid communication with the slot aperture configured to direct the liquid droplet away from the slot aperture and out of the compressor.

The droplet catcher as described herein present advantages over existing droplet separators, particularly those disposed on the outer circumferences of compressors. The disclosed droplet catcher enables the efficient collection of liquid droplets and directs them into channels that direct them out of the compressor before the droplets have time to coalesce and grow. The droplet catchers as disclosed herein remove the liquid droplets at the expecting points of impact with the impeller surface, before coalescence takes place, immediately removing the droplets from the surface so that there is no chance the liquid will be accelerated about the compressor again to form new droplets. As a result, the global volume fraction of liquid phase in the compressor can be maintained at an acceptable minimum range, thereby keeping operating conditions near those designed for the compressor, reducing damage, improving efficiency, and sustaining the life of the compressor.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While the invention has been described with reference to a preferred embodiment, it will be understood that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of improving the performance of a centrifugal compressor through liquid droplet removal, the method comprising:
    positioning a liquid droplet catching device in a portion of a centrifugal impeller comprising a plurality of impeller blades effective to capture the liquid droplet at a point of impact with the centrifugal impeller, wherein the liquid droplet catching device comprises an aperture disposed on a surface of at least one of the plurality of impeller blades, and a channel disposed beneath the aperture within the at least one of the plurality of impeller blades and in fluid communication with the aperture;
    capturing the liquid droplet in the aperture of the liquid droplet catching device; and removing the liquid droplet from the at least one of the plurality of impeller blades of the centrifugal compressor by directing the liquid droplet from the aperture to the channel of the liquid droplet catching device.

2. The method of claim 1, further comprising disposing, a groove disposed on a surface of the at least one of the plurality of impeller blades upstream of the liquid droplet catching device, wherein the groove is configured to direct the liquid droplet to the aperture.

3. The method of claim 1, wherein when the method of claim 1 is performed, a global volume fraction of a liquid phase in the centrifugal compressor is reduced.

4. A liquid droplet catching device, the device comprising:
    a compressor impeller compressing a plurality of impeller blades;
    a first aperture disposed on a surface of at least one of the plurality of compressor impeller blades and configured to receive the liquid droplet; and
    a channel disposed within the at least one of the plurality of compressor impeller blades and beneath and in fluid communication with the first aperture, wherein in the channel is configured to direct the liquid droplet away from the first aperture and out of the at least one of the compressor impeller blades.

5. The device of claim 4, wherein the surface of the at least one of the compressor impeller blades further comprises a plurality of grooves disposed thereon configured to direct the liquid droplet toward the first aperture.

6. The device of claim 1, wherein the first aperture has a slot shape.

7. The device of claim 4, further comprising a second aperture disposed downstream of the first aperture, wherein the second aperture comprises an upstream end and a downstream end, wherein the surface of the at least one of the compressor impeller blades at the upstream end bends down from and travels beneath the surface of the at least one of the compressor impeller blades at the downstream end to form the second aperture,
    wherein the second aperture is configured to direct a liquid film down the bend of the at least one of the compressor impeller blades surface and through the second aperture.

8. The device of claim 4, wherein the first aperture is disposed in a location of the at least one of the compressor impeller blades surface at a droplet impact area.

9. The device of claim 4, wherein the first aperture is disposed at a root portion of the at least one compressor impeller blades of the compressor impeller.

10. The device of claim 4, wherein the compressor impeller is disposed in an industrial compressor.

11. The device of claim 4, wherein the compressor impeller is disposed in a gas turbine engine.

12. The device of claim 4, wherein the liquid droplet catching device comprises:
a first surface; and
a second surface,
  wherein the first surface faces away from the at least one of the plurality of the compressor impeller blades and the second surface faces in the opposite direction of the first surface, and
  wherein the first aperture extends from the first surface of the liquid droplet catching device through the liquid droplet catching device and to the second surface of the liquid droplet catching device.

13. A centrifugal compressor, comprising:
a centrifugal impeller comprising:
  a plurality of rotating integral blades, each of the plurality of rotating integral blades having a root portion and a tip portion, wherein the plurality of rotating integral blades are configured to compress air in a centrifugal gravitational field; and
  at least one liquid droplet catching device disposed on at least one of the plurality of rotating integral blades, wherein the liquid droplet catching device comprises an aperture disposed on a surface of the at least one of the rotating integral blades, wherein the at least one liquid droplet catching device is configured to receive the liquid droplet, and a channel disposed beneath the aperture within the at least one rotating integral blades and in fluid communication with the aperture, wherein the channel is configured to direct the liquid droplet away from the aperture and out of the centrifugal compressor.

14. The compressor of claim 13, wherein the liquid droplet catching device further comprises a drainage line in fluid communication with the channel.

15. The compressor of claim 13, wherein one or more of the liquid droplet catching devices are disposed on a surface of each of the plurality of rotating integral blades.

16. The compressor of claim 15, wherein each of the surfaces of the plurality of rotating integral blades further comprises a plurality of grooves disposed thereon configured to direct the liquid droplet toward the aperture.

17. The compressor of claim 13; wherein the aperture has a slot shape.

18. The compressor of claim 13, further comprising a second aperture disposed downstream of the first aperture, wherein the second aperture comprises an upstream end and a downstream end, wherein the surface of the at least one of the rotating integral blades at the upstream end bends down from and travels beneath the surface of the at least one of the rotating integral blades at the downstream end to form the second aperture, wherein the second aperture is configured to direct a liquid film down the bend of the at least one of the rotating integral blades impeller surface and through the second aperture.

19. The compressor of claim 13, wherein the plurality of liquid droplet catching devices are disposed at a droplet impact area.

20. The compressor of claim 19, wherein the plurality of liquid droplet catching devices are disposed at the root portion of the plurality of rotating integral blades.

21. A gas turbine engine comprising the centrifugal compressor of claim 13.

* * * * *